United States Patent [19]

Steiner et al.

[11] Patent Number: 5,492,397
[45] Date of Patent: Feb. 20, 1996

[54] METHOD FOR TERMINATING A MOTOR VEHICLE AUTOMATIC BRAKING PROCESS

[75] Inventors: Manfred Steiner, Winnenden; Siegfried Rump, Weinstadt; Christoph Steffi, Blaufelden; Brian Douglas, Stuttgart; Joachim Nell, Esslingen; Franz Brugger, Winnenden; Martin Klarer, Kernen; Bernd Knoff, Esslingen; Albrecht Eckl, Stuttgart, all of Germany

[73] Assignee: Mercedes-Benz AG, Germany

[21] Appl. No.: 337,425

[22] Filed: Nov. 8, 1994

[30] Foreign Application Priority Data

Nov. 8, 1993 [DE] Germany .......................... 43 38 067.0

[51] Int. Cl.$^6$ ............................... B60T 7/12; B60T 8/32
[52] U.S. Cl. ............................................ 303/157; 303/158
[58] Field of Search ............................. 303/92, 95, 100, 303/113.4, 155, 157, 125, 154, 156, 158; 364/426.01, 426.02

[56] References Cited

U.S. PATENT DOCUMENTS

| | | | |
|---|---|---|---|
| 4,895,416 | 1/1990 | Tozu et al. | 303/92 |
| 5,158,343 | 10/1992 | Reichelt et al. | 303/113.4 |
| 5,236,256 | 8/1993 | Schmidt et al. | 303/113.2 |
| 5,261,730 | 11/1993 | Steiner et al. | 303/113.4 |

FOREIGN PATENT DOCUMENTS

| | | |
|---|---|---|
| 2230830 | 10/1990 | United Kingdom . |
| 2252373 | 8/1992 | United Kingdom . |
| 2253254 | 9/1992 | United Kingdom . |

Primary Examiner—Josie Ballato
Attorney, Agent, or Firm—Evenson, McKeown, Edwards & Lenahan

[57] ABSTRACT

A method for terminating an automatic braking process improves an automatic braking process by assuring that reliable termination of the braking process always takes place. Breaking-off criteria, which are independent of the actuation force of the brake pedal, are provided for the automatic braking process. The variables relating to the dynamics of vehicle movement or the activation time of the automatic braking process, if appropriate also as a function of variables relating to dynamics of vehicle movement, are used as the breaking-off criteria. Thus, automatic braking process is terminated as a function of vehicle behavior. In addition, the gradient of the braking pressure is determined as a function of the activation time and/or as a function of the switch-off criteria when the automatic braking process is terminated.

20 Claims, 2 Drawing Sheets

METHOD FOR TERMINATING A MOTOR VEHICLE AUTOMATIC BRAKING PROCESS

CROSS-REFERENCE TO RELATED APPLICATIONS

This application is related to application Ser. No. 08/337,426 filed on Nov. 8, 1994 in the name of Manfred Franz BRUGGER et al. for MONITORING METHOD AND DEVICE IN AUTOMATIC BRAKING PROCESS; to application Ser. No. filed 08/337,429 filed on Nov. 8, 1994 in the name of Siegfried RUMP et al. for METHOD FOR CONTROLLING THE TRIGGERING SENSITIVITY OF A VEHICLE AUTOMATIC BRAKING PROCESS TO MATCH DRIVER BEHAVIOR; to application Ser. No. 08/337,427 filed on Nov. 8, 1994 in the name of Siegfried RUMP et al. for METHOD FOR AUTOMATIC BRAKING OF MOTOR VEHICLES WITH AN ANTI-LOCK BRAKE SYSTEM; to application Ser. No. 08/337,443 filed on Nov. 8, 1994 in the name of Manfred STEINER et al. for DEVICE AND METHOD FOR TERMINATING AN AUTOMATIC BRAKING PROCESS IN MOTOR VEHICLES; and to application Ser. No. 08/337,432 filed on Nov. 8, 1994 in the name of Manfred STEINER for METHOD OF CONTROLLING SENSITIVITY OF VEHICLE AUTOMATIC BRAKING PROCESS.

BACKGROUND AND SUMMARY OF THE INVENTION

The present invention relates to an automatic braking process and, more particularly, to a method for terminating an automatic braking process for a motor vehicle, including the steps of initiating the automatic braking process upon fulfillment of a triggering criterion, building up a larger brake pressure with the automatic braking process than results from the position of a brake pedal, and terminating the automatic braking process by reduction of brake pressure to a brake pressure corresponding to a position of the brake pedal when a variable of a breaking-off criterion exceeds or drops below a threshold value assigned to the variable.

DE 40 28 290 C1 describes an automatic braking process which is to be carried out when the actuation speed exceeds a prescribed threshold value. During the automatic braking process, a higher brake pressure is built up than results from the position of the brake pedal. The automatic braking process is terminated when the pedal retraction speed exceeds an assigned threshold value. For this purpose, the brake pressure, which lies above the pressure corresponding to the position of the brake pedal, is reduced. During this process, the speed of the pressure reduction can be determined as a function of the maximum pedal travel realized by the brake pedal.

In non-prepublished Patent Application DE-P 43 25 940.5 it is proposed to match the triggering criterion to the automatic braking process. In addition, it is proposed there to terminate the automatic braking process when the force of the foot of the driver which is acting on the brake pedal drops below a threshold value.

The termination of the automatic braking process as a function of the pedal retraction speed is not reliable enough since the driver expects the automatic braking process to be terminated even with slow retraction of the brake pedal. Moreover, it is also not ensured that the automatic braking process is terminated when the vehicle is stationary.

An object of the present invention is to improve the braking process so that reliable termination of the braking process always takes place. Another object is to provide further criteria for breaking off the automatic braking process which are independent of the actuation force of the brake pedal.

These objects have been achieved according to the present invention on the basis of the automatic braking process in which a variable relating to the dynamics of vehicle movement or the activation time which has passed since the start of the automatic braking process is used as a variable of the breaking-off criterion and a gradient of the brake pressure reduction (dpB/dT) is determined as a function of at least one of the activation time (t) breaking-off criterion and an exceeding of the threshold value by the assigned variable relating to one of vehicle movement and brake pedal dependence.

Variables relating to vehicle movement dynamics can be used as the breaking-off criterion. This permits the automatic braking process to be terminated as a function of the behavior of the vehicle. In particular, the speed of the vehicle and the deceleration of the vehicle are the variables relating to vehicle movement dynamics.

A time-dependent breaking-off criterion can also be used. This time-dependent criterion ensures that the automatic braking process is terminated after a specific activation period. This criterion is therefore particularly suitable for use in conjunction with other breaking-off criteria as a safety measure in the case of operational faults. In this embodiment, it is then appropriate to prescribe a maximum operating period. According to further embodiments, the time-dependent breaking-off criterion can be determined as a function of variables relating to vehicle movement dynamics. Then, it is also suitable for use as a single breaking-off criterion. Of course, a plurality of breaking-off criteria can be used in parallel with one another or in conjunction with one another to terminate the automatic braking process. This is particularly interesting because the automatic braking process is critical for safety and it is necessary to be able to terminate it under all circumstances.

Reliably terminating the automatic braking process involves not only reliably detecting a breaking-off tinge but also reducing the brake pressure which is produced in addition to the brake pressure corresponding to the position of the brake pedal in a way which does not cause the driver to react in an undesirable way or estimate the driving situation incorrectly. Therefore, the gradient of the reduction of brake pressure can be determined as a function of the breaking-off criterion, activation time or as a function of the variable which is assigned to the threshold value of the breaking-off criterion exceeding or dropping below the threshold value.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
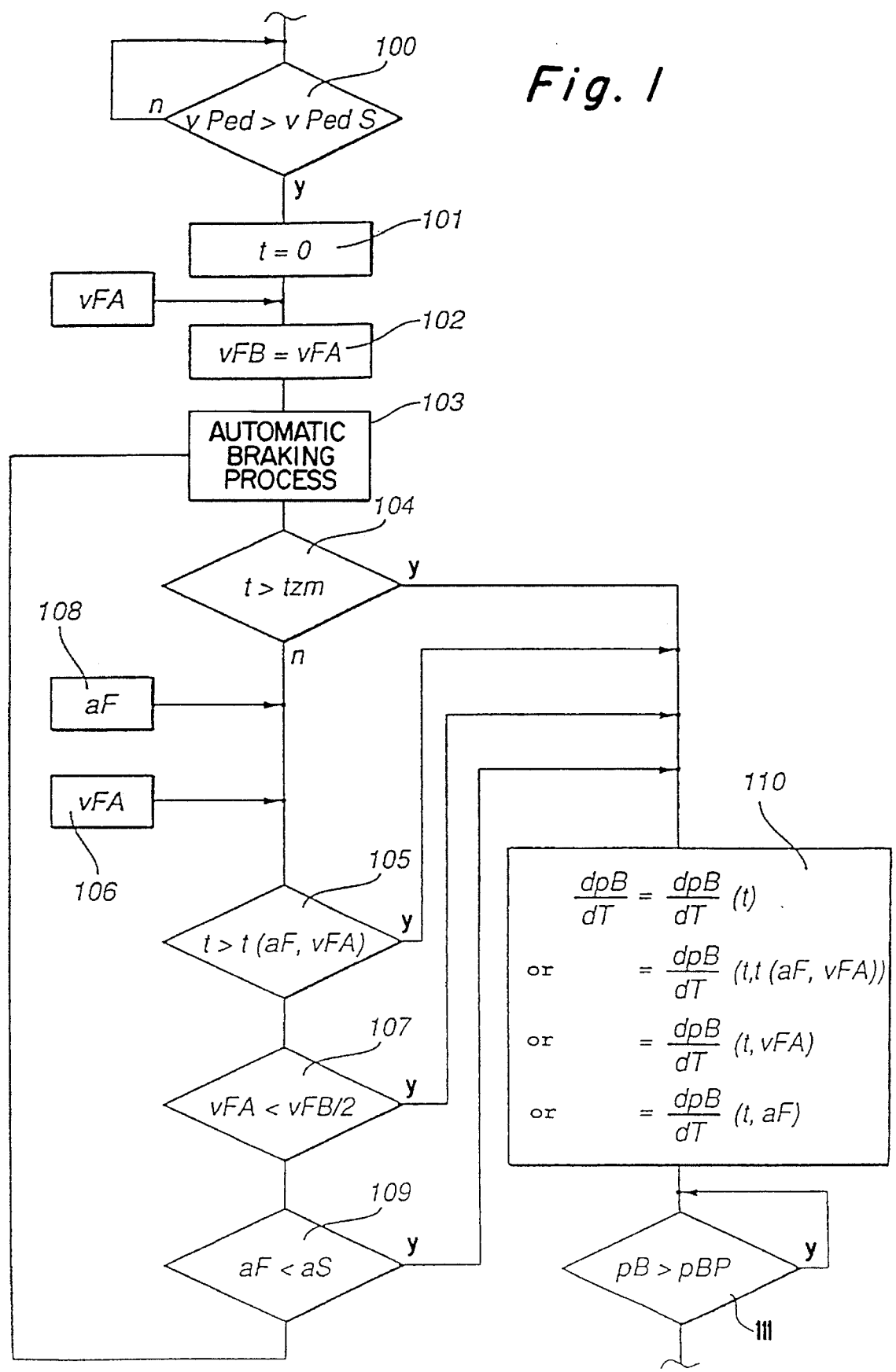
FIG. 1 is a flow diagram of a method for terminating the automatic braking process as a function of a plurality of breaking-off criteria.

FIG. 1 shows the flow diagram of a method for terminating the automatic braking process in which a plurality of breaking-off criteria have been combined with one another. The breaking-off criteria are successively tested. The first breaking-off criterion which is fulfilled terminates the automatic braking process. The reduction in brake pressure is then determined as a function of the activation time and the breaking-off criterion which leads to the termination of the automatic braking process. The braking pressure is returned to the brake pressure corresponding to the position of the brake pedal.

Step 100 contains the simplest triggering criterion for the automatic braking process. The automatic braking process is not triggered until the actuation speed vPed exceeds a threshold value vPeds. In step 101, the variable t which detects the activation period of the brake booster is reset. The instantaneous speed of the vehicle vFA is read in in step 102 as a value for the speed of the vehicle vFB at the start of the automatic braking process. Subsequently, the automatic braking process is initiated according to step 103. The pressure build-up of the automatic braking process can be carried out here, as can other improvements of the triggering criterion, for example in the same way as described in the aforementioned DE 40 28 290 C1 or in DE-P. 43 25 940.5.

The testing of the individual breaking-off criteria is contained in steps 104 to 109. In step 104, it is tested whether the activation time t which has passed since the start of the automatic braking process has exceeded a maximum value, tzm. The value of the maximum activation time, tzm, is for example selected such that, in the case of braking starting from the maximum speed of the vehicle with normal friction between wheel and road, the stationary start is achieved. This value of the maximum activation time, tzm, is approximately 10 s for a maximum vehicle speed of 250 km/h, a coefficient of adhesion of approximately 1 and a deceleration of the vehicle of 8 m/s². If the testing of the activation time t according to step 104 does not result in the automatic braking process being broken off, in step 105 it is tested whether the activation time exceeds a time threshold t(aF, vFA) which is dependent on the dynamics of vehicle movement. This time threshold t(aF,vFA) is determined from the speed of the vehicle, vFA, at the start of the braking process and from the deceleration of the vehicle. Here, for example the instantaneously reached deceleration of the vehicle, aF, is used as the value for the deceleration of the vehicle. The time threshold t(aF, vFA) is the time which still has to pass until the vehicle becomes stationary and can be calculated for example by the relation $$t(aF, vFA) = vFA/aF - t$$

This time threshold can both be calculated, as in this embodiment, for each test cycle and even be determined when a maximum deceleration of the vehicle is reached. The acceleration of the vehicle, aF, which is required in the calculation of the time threshold t(aF,vFA) for the dynamics of vehicle movement can be measured directly. The value of the deceleration, aF, of the vehicle which is determined in the control of the anti-lock brake system from the wheel speeds can also be used. The instantaneous speed of the vehicle, vFA, can also be taken from the signals of other control devices. In addition, the speed of the vehicle is required, for example, for determining a speed-dependent triggering and as a signal for the automatic braking process. The supply of a signal of the vehicle speed and of a signal of the acceleration of the vehicle is illustrated in step 106 and 108. In addition to the calculation, the dynamic time threshold t(aF,vFA) can be taken from a characteristic diagram.

In case the breaking-off criterion of the automatic braking process has not been fulfilled in step 105, it is tested in step 107 whether the speed of the vehicle, vFA, has already dropped below a speed threshold value vS which is calculated as a specific portion of the speed of the vehicle, vFB, at the start of the automatic braking process. The speed threshold value, vS, is for example 50% of the speed of the vehicle, vFB, at the start of the automatic braking process. Since the breaking-off criterion relating to the speed threshold value, vFB, always initiates termination of the automatic braking process earlier, the breaking-off criterion according to step 105 is in all events suitable as a safety measure in the case of a fault in step 107. However, since both breaking-off criteria relate to the speed of the vehicle, usually only one of the two breaking-off criteria is used.

In step 109 which is reached if the breaking-off criterion in step 107 has not been fulfilled, it is tested whether the deceleration, aF, of the vehicle has dropped below a threshold value, aS, or not. The threshold value, aS, here can be for example between 80% and 90% of the maximum deceleration of the vehicle, aFM, determined during the braking process or during the automatic braking process. The start or the duration of a braking process can be detected, for example, via the signal of the brake light switch. The start of the automatic braking process is detected via the instantaneous value of the activation period t. If this breaking-off criterion is not fulfilled either, the automatic braking process is carried on according to step 103.

In contract to the speed-dependent breaking-off criterion from step 107, in the acceleration-dependent breaking-off criterion according to step 109 there is no direct coupling to the breaking-off criterion from step 105, which is dependent on vehicle movement dynamics and on time, so that a parallel use of the breaking-off criterion according to step 109 with one of the criteria from step 105 or from step 107 may be entirely appropriate.

If one of the breaking-off criteria from steps 104, 105, 107 or 109 has been fulfilled, the brake pressure gradient dpB/dt is calculated in step 110 as a function of the activation time t and of the breaking-off criterion present apart from that in step 104 or else read off from a characteristic diagram. In step 111, it is then tested whether the brake pressure, pB, produced exceeds the brake pressure, pBP, corresponding to the position of the pedal. The automatic braking process is not completely terminated until the brake pressure, pB, has reached the value pBP.

Further breaking-off criteria for the automatic braking process, such as for example pedal travel sensors, diaphragm travel sensors, pedal force sensors and pedal speed sensors can be easily integrated into a corresponding breaking-off logic within the scope of the present invention.

Figure 2A:
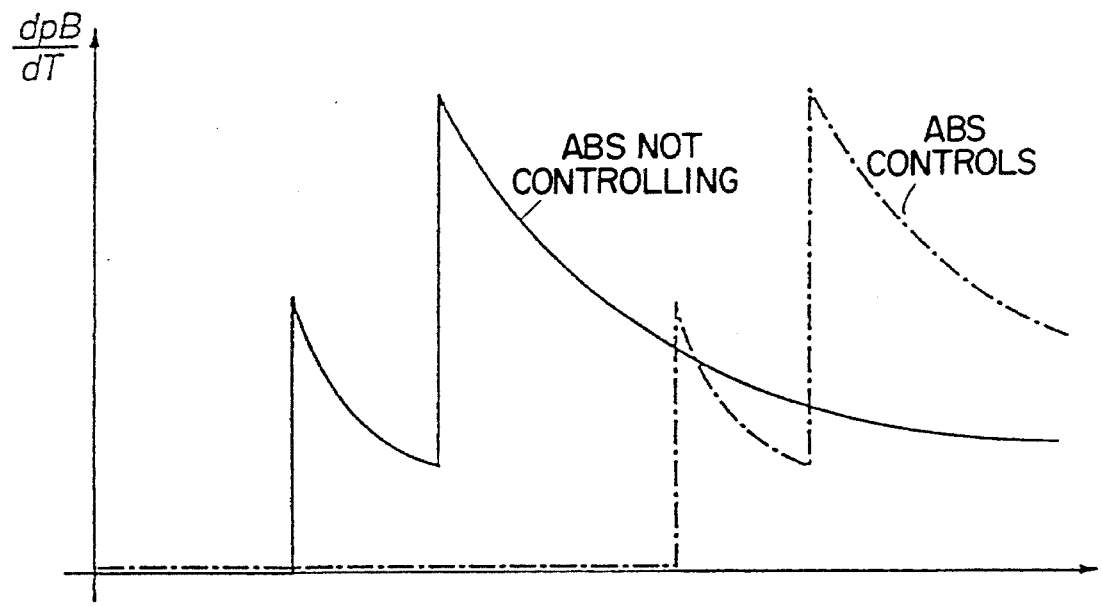
FIGS. 2a and 2b are graphs of the degree of opening of a venting valve as a function of the pedal retraction travel.
Figure 2B:
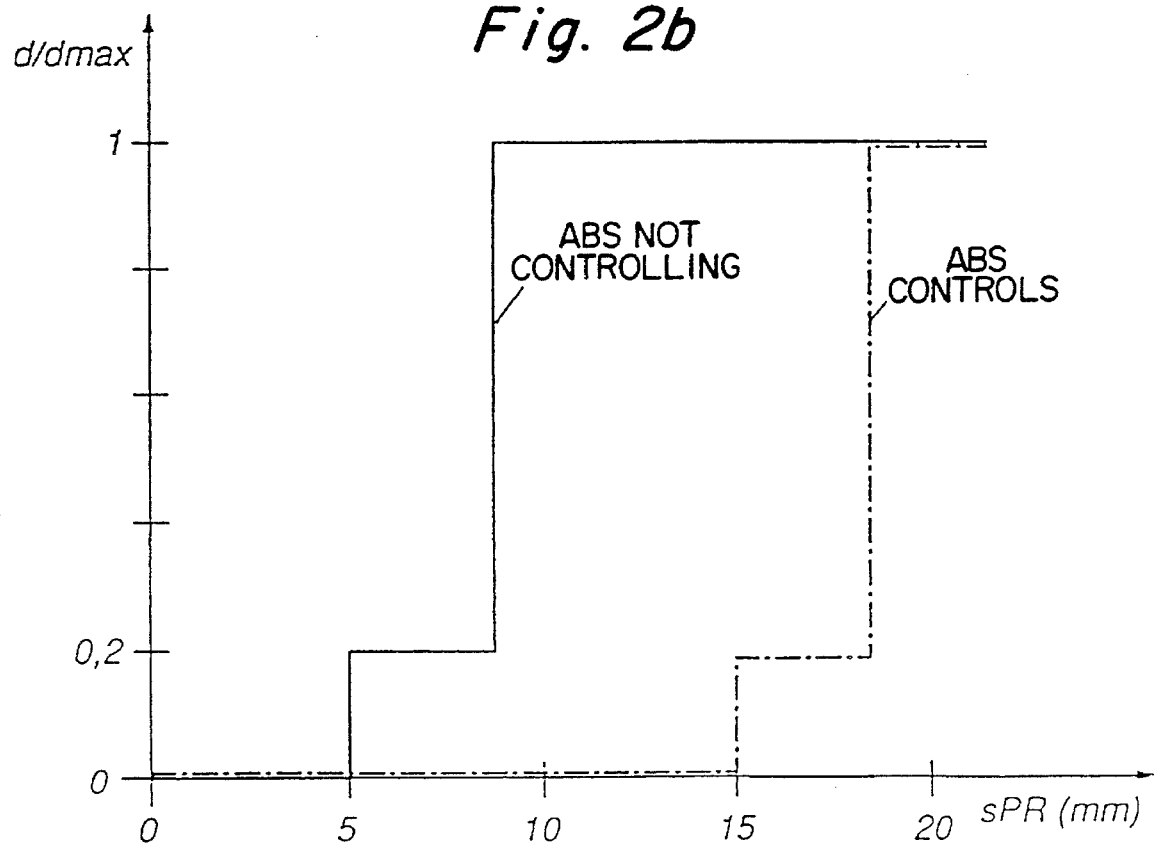

FIG. 2 shows that as an example the control of the brake pressure gradient, dpB/dT, can be carried out as a function of the pedal retraction travel of the brake pedal. The brake pressure gradient, dpB/dT, is produced by the opening of the venting valve in or on the brake booster. The curve shows the open state of the valve as a function of the pedal retraction travel, sPR, A reduction in brake pressure is produced by the opening of the valve, and the gradient of the reduction is determined by the pressure difference at the valve and the through-flow opening of the valve. This interrelation can be easily derived from the appropriate flow equations. When the valve opens, first a large gradient of the brake pressure is produced, which gradient is reduced with decreasing brake pressure. As the valve continues to open, the curve of the gradient initially increases steeply and then subsequently drops again similarly to the first reduction.

The pedal retraction travel, sPR, of the brake pedal is plotted on the abscissa of the graph. The pedal retraction travel, sPR, can be detected, for example, via the travel play of the transverse bolt in the forkhead of the pressure rod. The path measured there must then still be multiplied by the mechanical transmission ratio of the brake pedal in order to obtain the pedal retraction travel, sPR.

The degree of opening of the valve is plotted on the ordinate in the form of the ratio d/dmax of the opening diameter d to the maximum opening diameter dmax.

Two curves are plotted. The curve shown by an unbroken line is used when the anti-lock brake system (ABS) is not controlling at the breaking-off time of the automatic braking process. The curve shown by a dot-dash line applies if the ABS is controlling.

According to the curve shown by an unbroken line, the valve remains closed for as long as the pedal retraction travel is smaller than 5 mm. Starting from this pedal retraction travel, the valve is opened in a ratio, d/dmax, of 0.2. If the pedal is opened further and the pedal retraction travel exceeds 8 mm, the valve is completely opened.

If the brake pressure at the breaking-off time of the automatic braking process is controlled by the ABS, the pedal travel thresholds are increased. Starting from a pedal retraction travel of 15 mm, the valve is opened at a ratio, d/dmax, of 0.2 and starting from a pedal retraction travel of 18 mm the valve is completely opened.

The course of the pressure gradient, dpB/dT, produced by the valve actuation is entered as an example over the curves for the opening of the valve. With ABS control the dot-dash pressure gradient line applies, otherwise the unbroken line applies. The scale of the time axis has been adapted in such a way that the switching times and the valve-opening pedal travels correspond. The numerical values given here are only to be considered as directional or representative quantities since they are substantially dependent on the design at least of the vehicle brake. Thus, the mechanical transmission ratio of the brake pedal, like the brake pressure in the brake circuit and the valve diameter, exerts a direct influence on the switching thresholds and the degree of the valve opening.

In FIG. 2, the opening of the valve, that is to say the gradient of the pressure reduction, has been represented as a function of a pedal retraction travel. Corresponding curves and characteristic diagrams can of course also be produced for the other breaking-off criteria.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for terminating an automatic braking process for a motor vehicle, comprising the steps of initiating the automatic braking process upon fulfillment of a triggering criterion, building up a larger brake pressure with the automatic braking process than results from the position of a brake pedal, and terminating the automatic braking process by reduction of brake pressure to a brake pressure corresponding to a position of the brake pedal when a variable of a breaking-off criterion exceeds or drops below a threshold value assigned to the variable, wherein a variable relating to the dynamics of vehicle movement is the variable of the breaking-off criterion.

2. The method according to claim 1, wherein the speed of the vehicle is the variable relating to the dynamics of vehicle movement, and a speed threshold value is determined as a function of the speed of the vehicle at one of a braking process start and at an automatic braking process start.

3. The method according to claim 2, wherein the speed threshold value is between 40% to 60% of the speed of the vehicle at the braking process start, and the automatic braking process is terminated when the speed drops below the speed threshold value.

4. The method according to claim 1, wherein the deceleration of the vehicle is the variable relating to the dynamics of vehicle movement, a deceleration threshold value being determined as a function of a maximum achieved deceleration of the vehicle.

5. The method according to claim 4, wherein the deceleration threshold value is between 80% and 90% of the maximum deceleration of the vehicle, and the automatic braking process is terminated when the deceleration of the vehicle drops below this threshold value.

6. The method according to claim 1, wherein a time required to brake the vehicle to a specific speed with a specific deceleration is the threshold value.

7. The method according to claim 6, wherein the specific speed is between about 0 km/h and 5 km/h.

8. The method according to claim 6, wherein the specific speed is a prescribed portion of speed of the vehicle at the start of the automatic braking process.

9. The method according to claim 8, wherein the prescribed portion is between about 40% and 60% of the vehicle speed.

10. The method according to claim 6, wherein a value for maximum deceleration of the vehicle reachable by the vehicle is the specific deceleration.

11. The method according to claim 6, wherein a value of actual deceleration of the vehicle during the automatic braking process is the specific deceleration.

12. A method for terminating an automatic braking process for a motor vehicle, comprising the steps of initiating the automatic braking process upon fulfillment of a triggering criterion, building up a larger brake pressure with the automatic braking process than results from the position of a brake pedal, and terminating the automatic braking process by reduction of the brake pressure to a brake pressure corresponding to a position of a brake pedal when a variable of a breaking-off criterion varies in relation to an assigned threshold value, wherein an activation time which has passed since the start of the automatic braking process is the variable of the breaking-off criterion.

13. The method according to claim 12, wherein a fixed time threshold value of between about 0.55 and 10 s is prescribed for the activation time.

14. The method according to claim 12, wherein the time threshold value is a function of variables relating to dynamics of vehicle movement.

15. A method for terminating an automatic braking process for a motor vehicle, comprising the steps of initiating the automatic braking process upon fulfillment of a triggering criterion, building up a larger brake pressure with the automatic braking process than results from a position of a brake pedal, and terminating the automatic braking process by reduction of brake pressure to a brake pressure corresponding to a position of the brake pedal when a variable of a breaking-off criterion exceeds an assigned threshold value, wherein a gradient of the brake pressure reduction is determined as a function of the breaking-off criterion comprising at least one of activation time and an exceeding of the threshold value by an assigned variable relating to one of vehicle movement dynamics and brake pedal position.

16. The method according to claim 15, including the step of detecting a pedal retraction travel by a relative travel play between the brake pedal and a brake booster pressure rod.

17. The method according to claim 16, wherein the step of providing the travel play occurs by an elongated hold in a pressure rod forkhead and extends in a direction of movement of the pressure rod with the brake pedal attached thereto by a transverse bolt which penetrates the elongated hole and a relative travel which is dependent on retraction speed produced between a pressure rod-side stop of the elongated hole and transverse bolt at least during the retraction of the brake pedal.

18. The method according to claim 16, wherein the step of providing the pressure reduction occurs in relation to the pedal retraction travel in two stages, one of the stages producing a small gradient of the brake pressure after a first relative travel threshold is exceeded and the second stage producing a large gradient of the brake pressure after a second relative travel threshold is exceeded.

19. The method according to claim 18, wherein the step of determining the first and the second relative travel thresholds occurs as a function of the activation of an anti-lock brake system of the vehicle.

20. The method according to claim 19, including the step of providing that, when the anti-lock brake system is not present or is not activated, the first relative travel threshold lies at approximately 5 mm pedal travel and the second relative travel threshold lies at approximately 8 mm pedal travel and, when the anti-lock brake system is activated, the first relative travel threshold lies at approximately 15 mm pedal travel and the second relative travel threshold lies at approximately 18 mm pedal travel.

* * * * *